US010108471B2

(12) United States Patent
Shen et al.

(10) Patent No.: US 10,108,471 B2
(45) Date of Patent: Oct. 23, 2018

(54) SYSTEM AND METHOD FOR UTILIZING HISTORY INFORMATION IN A MEMORY DEVICE

(71) Applicant: SanDisk Technologies Inc., Plano, TX (US)

(72) Inventors: Zhenlei Shen, Milpitas, CA (US); Xinde Hu, San Jose, CA (US); Lei Chen, Sunnyvale, CA (US); Yiwei Song, Union City, CA (US)

(73) Assignee: SanDisk Technologies LLC, Plano, TX (US)

( * ) Notice: Subject to any disclaimer, the term of this patent is extended or adjusted under 35 U.S.C. 154(b) by 202 days.

(21) Appl. No.: 14/584,825

(22) Filed: Dec. 29, 2014

(65) Prior Publication Data
US 2016/0188401 A1 Jun. 30, 2016

(51) Int. Cl.
G06F 11/00 (2006.01)
G06F 11/07 (2006.01)

(52) U.S. Cl.
CPC ...... G06F 11/0751 (2013.01); G06F 11/0703 (2013.01); G06F 11/073 (2013.01)

(58) Field of Classification Search
CPC ............. G06F 11/0793; G06F 11/073; G06F 11/0751; G06F 11/0787; G06F 11/079; G06F 11/3055; G06F 11/3065; G06F 11/3086; G06F 11/0703; G06F 11/08; G06F 11/14
See application file for complete search history.

(56) References Cited

U.S. PATENT DOCUMENTS

| | | | |
|---|---|---|---|
| 8,719,660 B2 | 5/2014 | Peng et al. | |
| 2007/0101096 A1 | 5/2007 | Gorobets | |
| 2008/0104310 A1 | 5/2008 | Stern et al. | |
| 2008/0244162 A1 | 10/2008 | Mokhlesi et al. | |
| 2009/0198869 A1 | 8/2009 | Mosek | |
| 2010/0306598 A1* | 12/2010 | Ackaret | G06F 11/073 714/47.1 |
| 2011/0173484 A1* | 7/2011 | Schuette | G06F 11/0727 714/2 |
| 2011/0296122 A1 | 12/2011 | Wu et al. | |
| 2014/0164674 A1 | 6/2014 | Verhaeghe et al. | |
| 2014/0380106 A1 | 12/2014 | Presman et al. | |
| 2015/0006976 A1* | 1/2015 | Jeon | G06F 11/0751 714/54 |

* cited by examiner

Primary Examiner — Bryce P Bonzo
Assistant Examiner — Anthony J Amoroso
(74) Attorney, Agent, or Firm — Brinks Gilson & Lione

(57) ABSTRACT

Systems and methods for controlling blocks in a memory device using a health indicator (such as the failed bit count) for the blocks are disclosed. However, the health indicator may exhibit noise, thereby resulting in an unreliable indicator of the health of the blocks in the memory device. In order to filter out the noise, a rolling average of the health indicator may be determined, and compared to the current health indicator. The comparison with the rolling average may indicate whether the current health indicator is an outlier, and thus should not be used. The health indicator may also be used to predict a future health indicator for different blocks in the memory device. Using the predicted future health indicator, the use of the blocks may be changed in order to more evenly wear the blocks.

8 Claims, 17 Drawing Sheets

SYSTEM AND METHOD FOR UTILIZING HISTORY INFORMATION IN A MEMORY DEVICE

TECHNICAL FIELD

This application relates generally to managing data in a memory device. More specifically, this application relates to utilizing history information in managing memory in the memory device.

BACKGROUND

Flash data memory devices read and write data to the flash memory. The flash memory may be divided into different sections, such as into blocks. The controller within the flash memory may seek to level the wear amongst the different blocks in the flash memory in order to prolong the longevity of the flash memory. For example, one indicator of failure rate for the blocks may comprise the error rate when reading data from a respective block. More specifically, based on the error rate for a respective block, the controller may determine to copy data from the respective block into another block.

BRIEF SUMMARY

According to one aspect, a method for a memory device is disclosed which includes: accessing a current health indicator for a section of memory in the memory device, the current health indicator indicative usability of the section of memory; accessing a historical rolling health indicator for the section of memory; comparing the historical rolling health indicator with the current health indicator; determining whether to use the current health indicator based on the comparison; in response to determining to use the current health indicator, using the current health indicator to perform at least one action for the memory device; and in response to determining not to use the current health indicator, rejecting the current health indicator when determining whether to perform the at least one action for the memory device.

According to another aspect, a method for a memory device is disclosed which includes: accessing a plurality of health indicators for a section of memory in the memory device; determining, based on the plurality of health indicators, a forecast for the health indicator at a future point of operation of the memory device; and determining, based on the forecast for the health indicator, whether to perform an operation on the section of memory.

According to yet another aspect, a memory device is disclosed. The memory device includes: a rolling historical health indicator module configured to determine a rolling historical health indicator for a section of memory of the memory device; a current health indicator module configured to determine a current health indicator of the section of memory of the memory device; and a current health indicator evaluator configured to determine, based on the rolling historical health indicator, whether or not to use the current health indicator in determining whether to perform an action for the memory device.

According to still another aspect, a memory device is disclosed. The memory device includes: a heath indicator forecasting module configured to forecast a health indicator for respective sections of memory of the memory device; a comparison module configured to compare the forecasted health indicators for the respective sections; and a modification module configured to modify use of one or more of the respective section of the memory based on the comparison of the forecasted health indicators for the respective sections.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1A:
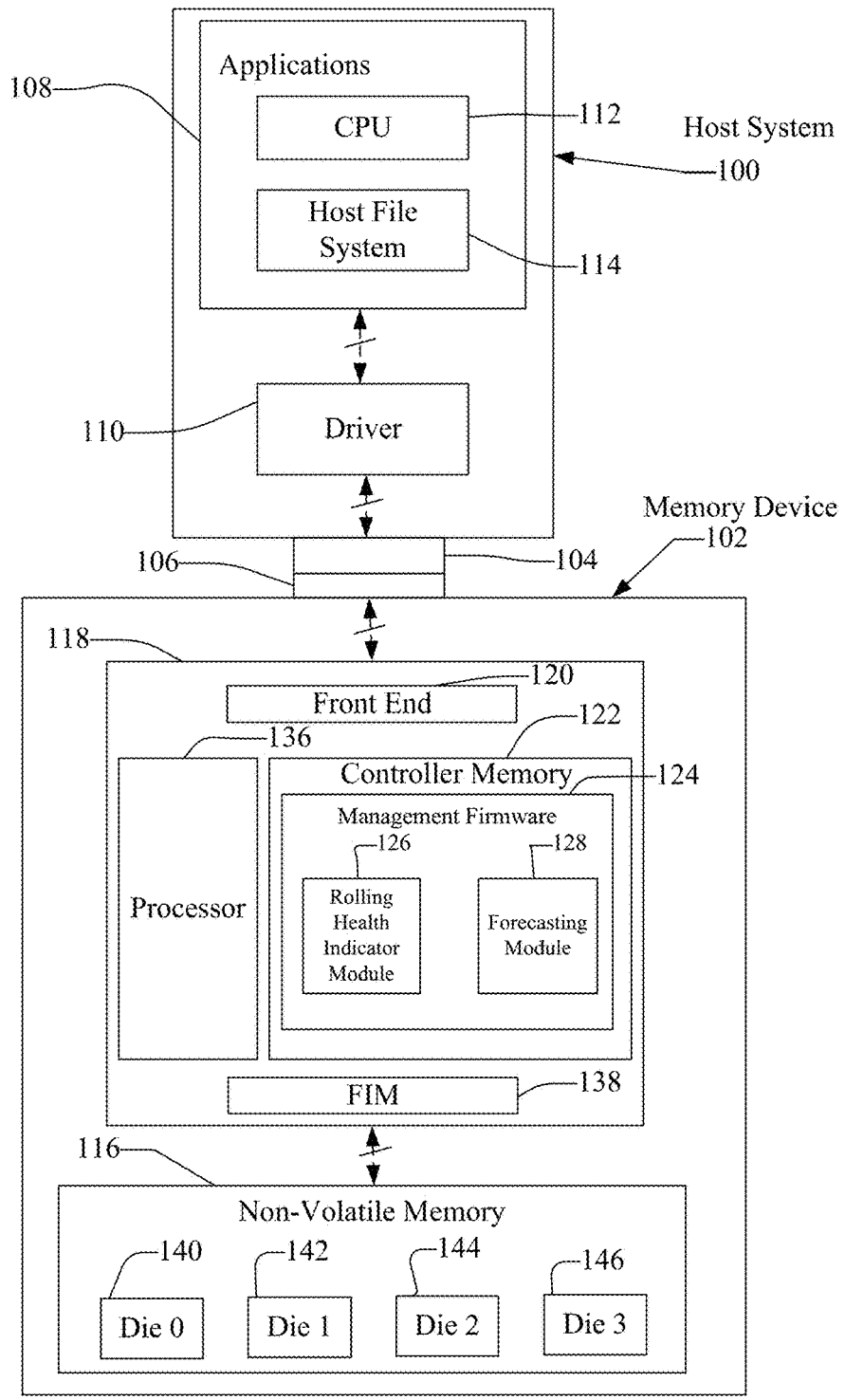
FIG. 1A illustrates a host system connected with a memory device.

A memory device suitable for use in implementing aspects of the invention is shown in FIGS. 1A-6. A host system 100 of FIG. 1A stores data into and retrieves data from a memory device 102. The memory device 102 may be memory embedded within the host, such as in the form of a solid state disk (SSD) drive installed in a personal computer. Alternatively, the memory device 102 may be in the form of a card that is removably connected to the host system 100 through mating parts 104 and 106 of a mechanical and electrical connector as illustrated in FIG. 1A. A memory configured for use as an internal or embedded SSD drive may look similar to the schematic of FIG. 1A, with the primary difference being the location of the memory device 102 internal to the host system 100. SSD drives may be in the form of discrete modules that are drop-in replacements for rotating magnetic disk drives.

The host system 100 of FIG. 1A may be viewed as having two major parts, insofar as the memory device 102 is concerned, made up of a combination of circuitry and software. They are an applications portion 108 and a driver portion 110 that interfaces with the memory device 102. In a personal computer, for example, the applications portion 110 can include a processor 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The memory device 102 of FIG. 1A may comprise a semiconductor memory device. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Referring back to FIG. 1A, the memory device 102 may include non-volatile memory, such as memory 116, and a system controller 118 that both interfaces with the host system 100 to which the memory device 102 is connected for passing data back and forth and controls the memory 116. Other types of non-volatile memory are contemplated, such as resistive memory, which may be composed of a plurality of resistive memory cells, and ferroelectric memory.

When communicating with the memory device, the host system 100 may send logical addresses of data, such as in the form of a range of logical block addresses (LBAs). The system controller 118 may then convert the LBAs, in one or more steps, to the actual physical addresses on the memory 116. The system controller 118 may perform a logical address-to-actual physical address conversion in order to map to the actual physical addresses. For example, the LBAs from the host system 100 may be mapped to memory device internal logical addresses, and the memory device internal logical addresses are mapped to the actual physical addresses. As another example, the LBAs from the host system 100 may be mapped directly to the actual physical addresses.

FIG. 1A illustrates that the memory 116 includes four memory die 140, 142, 144, 146. The number of memory die is merely for illustrative purposes. Other numbers of memory die are contemplated.

The system controller 118 may perform a variety of functions. FIG. 1A illustrates the various functions of the system controller 118, including a front end 120, a processor 136, a controller memory 122, and one or more flash interface modules (FIMs) 138. The front end 120 interfaces with the host system 100 and one or more flash interface modules (FIMs) 138 provide a communication interface between the system controller 118 with the memory 116. The controller memory 122 may store controller firmware logic for coordinating operation of the memory 116 and for internal memory management operations. As one example, the controller firmware, when executed by the processor 136, may perform a multitude of operations, such as managing host communications, mapping host requests to NAND addresses, executing NAND operations, reporting completion status to host, etc. As another example, the controller firmware may include management firmware 124 that, when executed, includes the functionality discussed in more detail below. Examples of the firmware may include rolling health indicator module 126 and forecasting module 128.

As discussed above, rolling health indicator module 126 and forecasting module 128 are included in firmware. Any one, any combination or all of rolling health indicator module 126 and forecasting module 128 can be implemented as software, hardware, or a combination of hardware and software inside system controller 118 or can be implemented as a component outside of the system controller 118. Further, rolling health indicator module 126 and forecasting module 128 are illustrated in FIG. 1A as separate entities. Alternatively, any combination or all of rolling health indicator module 126 and forecasting module 128 may be included in a single software program or in a single hardware implementation. The functions of the system controller 118 as depicted in FIG. 1A are merely for illustration purposes.

A section of memory may have a limited period until the section is deemed too unreliable for use by the memory device. After the section of memory is deemed too unreliable for use, the section of memory is no longer used by the memory device. In this regard, the section of memory may be characterized by a health indicator, which may comprise an indication of usability of the section of memory. More specifically, the health indicator may comprise the period (e.g., the number of cycles or time) until the section of memory is unusable. As discussed in more detail below, examples of the health indicator include, but are not limited to: bit error rate (BER); erase speed; or program speed.

Figure 9A:
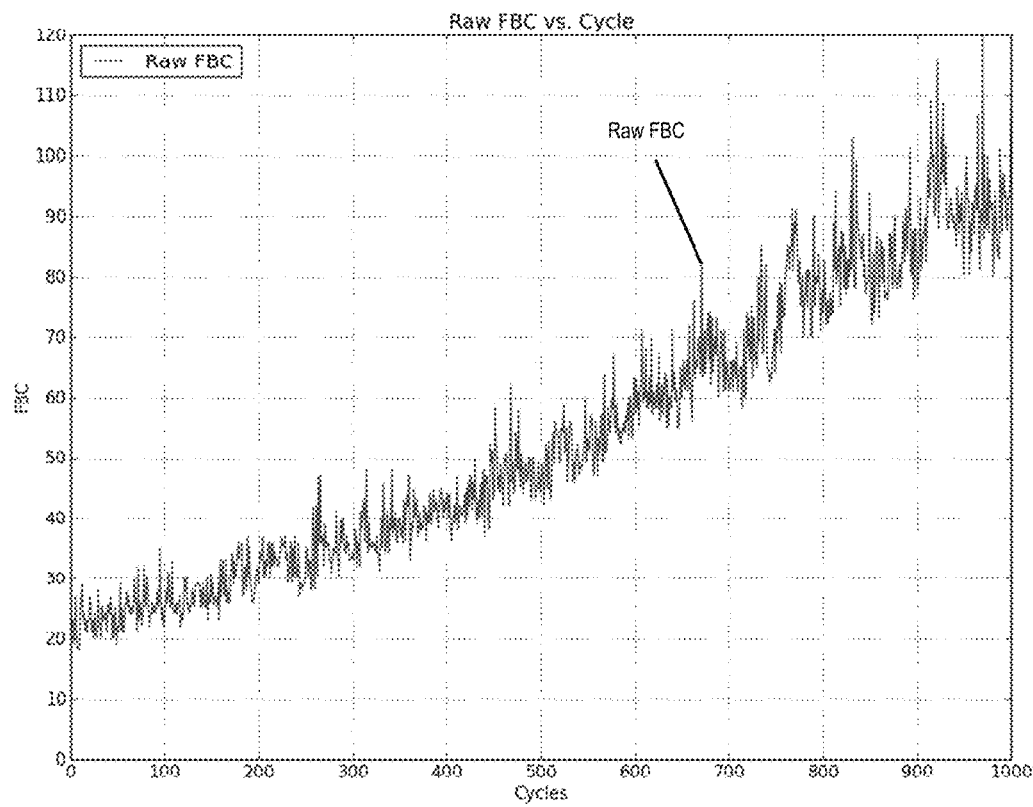
FIG. 9A illustrates a graph of the raw failed bit count.
Figure 9B:
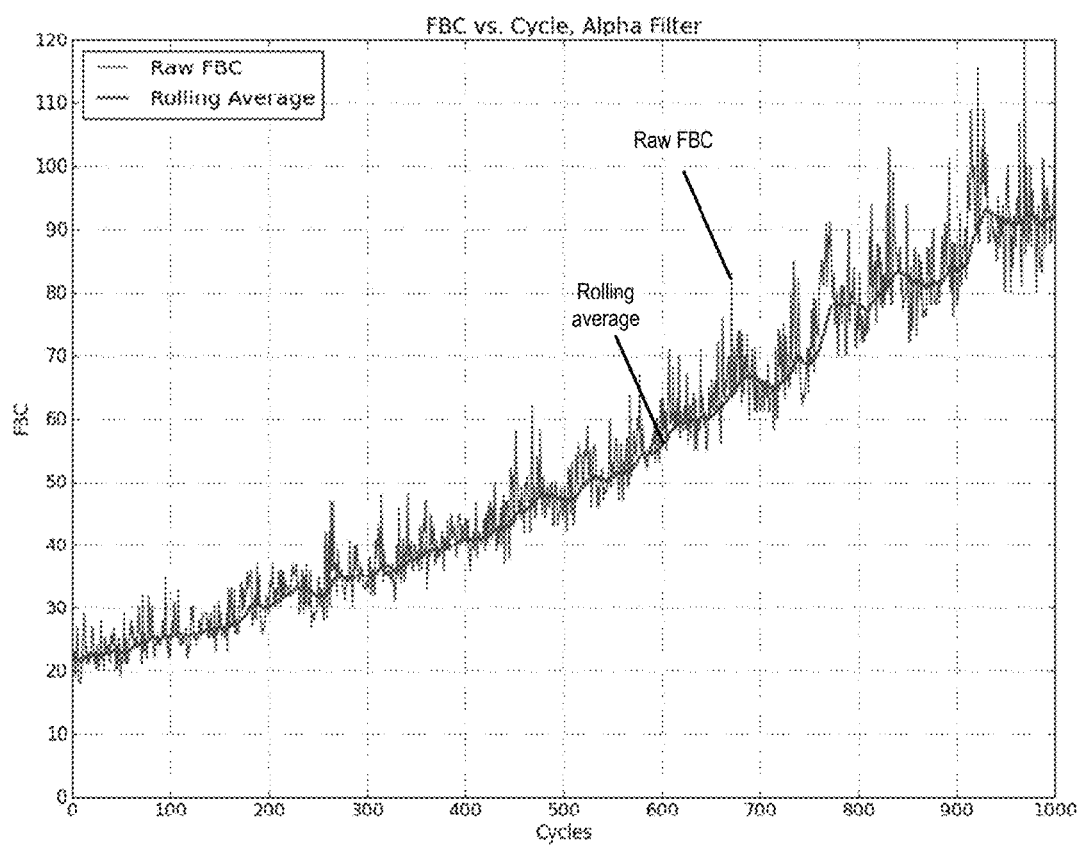
FIG. 9B illustrates a graph of the raw failed bit count and the rolling average.

As discussed above, the memory device may use the bit/cell error rate to evaluate the health of blocks, or dies. However, the error rate (or other failure indicator) may not be reliable. In particular, there may be considerable noise in the measurement of error rate, which may hinder the proper evaluation on the blocks, or dies. For example, FIG. 9A illustrates the raw failed bit count (FBC), which exhibits considerable noise. In this regard, if noise results in an erroneously high error rate, the memory device may determine the block might be bad, even though the block is actually healthy. This may lead to an unstable system. In one embodiment, a filter is used to filter out noise associated with the health indicator. More specifically, a rolling average of the error rate may be determined in order for a more robust memory device. An example of the rolling average is illustrated in FIG. 9B, discussed in more detail below. For example, the current bit error rate (or other health indicator) may be compared to rolling average in order to determine whether the current bit error rate (or other health indicator) is an outlier and may be rejected.

In an alternate embodiment, the memory device may forecast future behavior of the health indicator. In a first specific embodiment, the forecast of the health indicator may be performed in a present time, with the forecast used to affect operation of the memory device in the present time. For example, the memory device may forecast the bit error rate for one block or multiple blocks in the memory. In one more specific example, the forecast for the one block or multiple blocks may comprise a time at which an event occurs within a respective block. In particular, the forecast may thus determine a future time at which the bit error rate for a respective block is uncorrectable. In another more specific example, the forecast for the multiple blocks may comprise a condition of the respective block at a predetermined future time. In particular, the forecast may determine at a predetermined future time, the bit error rate for each respective block. Based on the forecast, the memory device may determine a present action, such as use of one or more of the blocks in the present time. In a second more specific embodiment, the forecast of the health indicator may be performed in a present time, with the forecast used to affect operation of the memory device in another time. For example, the memory device may forecast the bit error rate for one block or multiple blocks in the memory, with the forecast determining a time in the future at which the bit error rate for a respective block is uncorrectable. Based on the forecast, the memory device may determine to tune one or more operating parameters associated with the respective block, thereby affecting use of the respective block. In this regard, the forecast may be used to more evenly wear the different blocks in the memory.

Figure 1B:
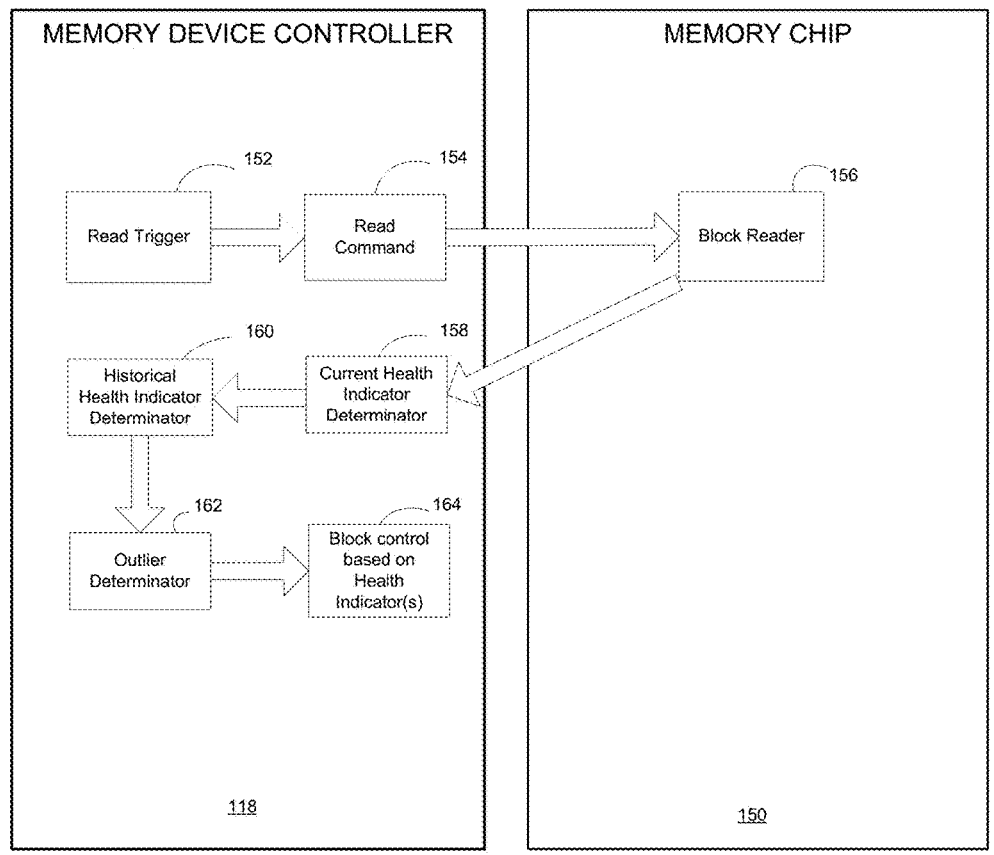
FIG. 1B illustrates another block diagram of the memory device controller and the memory chip of FIG. 1A.

FIG. 1B illustrates another block diagram of the memory device controller 118 and memory chip 150. Memory chip 150 may include one or more dies 140, 142, 144, 146 illustrated in FIG. 1A. As shown in FIG. 1B, in one embodiment, the memory device controller 118 may command a read of part of the memory chip 150 (such as part or all of a block), determine the current health indicator of part or all of the block based on the read, and determine whether the current health indicator is an outlier. To that end, the memory device controller 118 may include a read trigger module 152, a read command module 154, a current health indicator determinator module 158, a historical health indicator module 160, an outlier determinator module 162, and a block control based on health indicator(s) module 164. Any one, any combination, or all of the read trigger module 152, the read command module 154, the current health indicator determinator module 158, the historical health indicator module 160, the outlier determinator module 162, and the block control based on health indicator(s) module 164 can be implemented as software, hardware, or a combination of hardware and software. The memory chip 150 may include a block reader module 156, which can be implemented as software, hardware, or a combination of hardware and software.

The read trigger module 152 may comprise the trigger for selecting a block in the memory array to read. In response to the trigger from read trigger module 152, the read command module 154 may generate a read command to send to the memory chip 150 to read the selected block. In response to receiving the read command, the block reader module 156 reads part or all of the selected block.

The current health indicator determinator module 158 may receive the results of the read, and determine a current health indicator of part or all of the block. Part or all of the read, such as the errors in the read, may be analyzed to determine the health indicator of the block. One example of a health indicator is bit error rate for a block (or other part of the memory). More specifically, errors in the read may be determined using an error correction coding (ECC) engine to generate a bit error rate (BER). Another example of a health indicator is the erase speed of a part of memory (such as a block of memory). More specifically, the erase speed may slow as the block ages, thereby indicating the block health. Still another example of a health indicator is the program speed of a part of memory (such as a block of memory). More specifically, the program speed may increase as the block ages, thereby indicating block health. Still other health indicators are contemplated.

The historical health indicator determinator module 160 may determine the historical health indicator. In one embodiment, the historical health indicator determinator module 160 may determine the historical health indicator by accessing a memory location that stores a previously calculated historical health indicator. As discussed in more detail below, the historical health indicator may comprise a filtered health indicator. One example of the historical health indicator may include a weighted rolling average, such as illustrated in the following:

$$y_i = a^* x_i + (1-a)^* y_{i-1}$$

where $y_i$: historical health indicator;
$y_{i-1}$: previous historical health indicator;
$x_i$: current health indicator (e.g. current bit error count)
a: weight of current measurement.

$x_i$ may be the current health indicator for a part of memory, such as for an entire block within the memory, a wordline within a block of the memory, or a set of wordlines within the block of the memory. For example, $x_i$ may be based on a single BER or on multiple BERs. In particular, a BER may be generated for a single wordline, and may be used as the current health indicator for the respective wordline, or may be used as the current health indicator for the block in which the respective wordline resides. As another example, a BER may be generated for each of a plurality of wordlines. The BERs may then be mathematically combined (e.g., averaged) to generate the current health indicator for the block in which the plurality of wordlines reside.

Further, the value of "a" may be selected from between 0 and 1. In instances where the current health indicator may exhibit a lot of noise, the value of the current health indicator may be lessened by choosing a lower value of "a" (e.g., closer to 0). In this regard, a smaller value of "a" may indicate a smoother value of the historical health indicator.

In one embodiment, the value of "a" may be predetermined and non-variable. More specifically, the value of "a" may be programmed during manufacture of the memory device. In an alternate embodiment, the value of "a" may be determined dynamically depending on analysis of an amount of noise exhibited by the current health indicator.

Thus, the rolling filter may fold the history information of the health indicator into a single quantity, namely the historical health indicator $y_i$. In this regard, the historical health indicator may use less memory, and may require less computation.

The outlier determinator module 162, using the historical health determinator module 160, determines whether the current health indicator is an outlier. As discussed in more detail below, the current health indicator may be compared with the historical health indicator. In the event that the current health indicator is different than the historical health indicator by more than a predetermined amount (e.g., greater or less than the historical health indicator), the outlier determinator module 162 may determine that the current health indicator is an outlier.

Block control based on health indicator(s) module 164 may use the output of outlier determinator module 162 to determine whether to block use of the current health indicator. For example, outlier determinator module 162 may determine that the current health indicator is an outlier. In response, block control based on health indicator(s) module 164 may determine to reject the current health indicator.

Figure 1C:
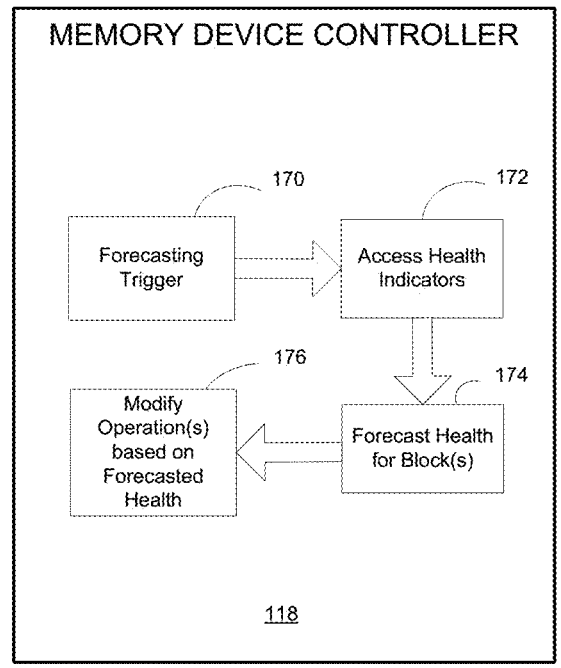
FIG. 1C illustrates still another block diagram of the memory device controller.

FIG. 1C illustrates still another block diagram of the memory device controller 118. As shown in FIG. 1C, in one embodiment, the memory device controller 118 may forecast the health indicator of part or all of the memory, and may modify operation(s) based on the forecasted health indicator. To that end, the memory device controller 118 may include a forecasting trigger module 170, an access health indicator module 172, a forecast heath for block(s) module 174 and a modify operation(s) based on forecasted health module 176. Any one, any combination, or all of the forecasting trigger module 170, the access health indicator module 172, the forecast heath for block(s) module 174 and the modify operation(s) based on forecasted health module 176 can be implemented as software, hardware, or a combination of hardware and software.

The forecasting trigger module 170 may determine when to trigger forecasting of the health indicator. As one example, the forecasting may be triggered at predetermined time intervals. As another example, the forecasting may be triggered based on other activity within the memory device. More specifically, the memory device may request selection of a block for a write. The request (or in anticipation of the request) may serve as the trigger.

The access health indicators module 172 may access the health indicators for a section of memory, such as a block. As one example, the number of health indicators accessed may be predetermined in number, such as the prior 600 health indicators (e.g., the last 600 observed cycles of the bit error rate).

Based on the accessed health indicators, the forecast health for block(s) module 174 may forecast the health indicator. As discussed in more detail below, the forecast may be performed in a variety of ways. In one instance, a polynomial may be fit to the accessed health indicators, with the polynomial then being used to predict future behavior. In one specific example, the forecast health for block(s) module 174 may use the polynomial in order to extrapolate to a predetermined cycle in the future (such as 1000 cycles in the future). In another specific example, the forecast health for block(s) module 174 may determine, based on the polynomial indicating the forecast of the health indicator, when (or at what cycle) in the future the health indicator may have a predetermined value (such as a bit error rate that is uncorrectable by an ECC engine).

Based on the forecast as determined by the forecast health for block(s) module 174, the modify operation(s) based on forecasted health module 176 may modify operation of the memory device. More specifically, the memory device may seek to level the wear in a plurality of blocks in the memory device. In this regard, the memory device may seek to modify operation of the memory device such that the health indicator at a future time for respective blocks may be the same as (or may be more similar to) one another. For example, the memory device may modify operation in order for the plurality of blocks to fail at approximately the same time (or to fail closer in time to one another). In order to achieve this, the memory device may modify operation such that the time at which the bit error rate for a respective block is an uncorrectable amount, as forecasted, is the same time (or within a predetermined time period) as the time at which the forecasted bit error rate for another respective block becomes correctable.

One example of an operation may comprise garbage collection. Garbage collection is a memory management tool in which memory cells that contain unneeded or invalid data may be erased so that the memory cells may be reused by the memory device. The memory management tool may select which blocks to garbage collect based on one or more factors, such as the amount of invalid data in the blocks and the forecasted health for the blocks. For example, in response to determining that two blocks have the same amount of invalid data contained therein, the memory management tool may examine the forecasted health of the two blocks and select the block that is considered healthier (e.g., will fail at a later forecasted time). In this regard, the operation of the memory device may be changed based on the forecasted health of the blocks.

Figure 2A:
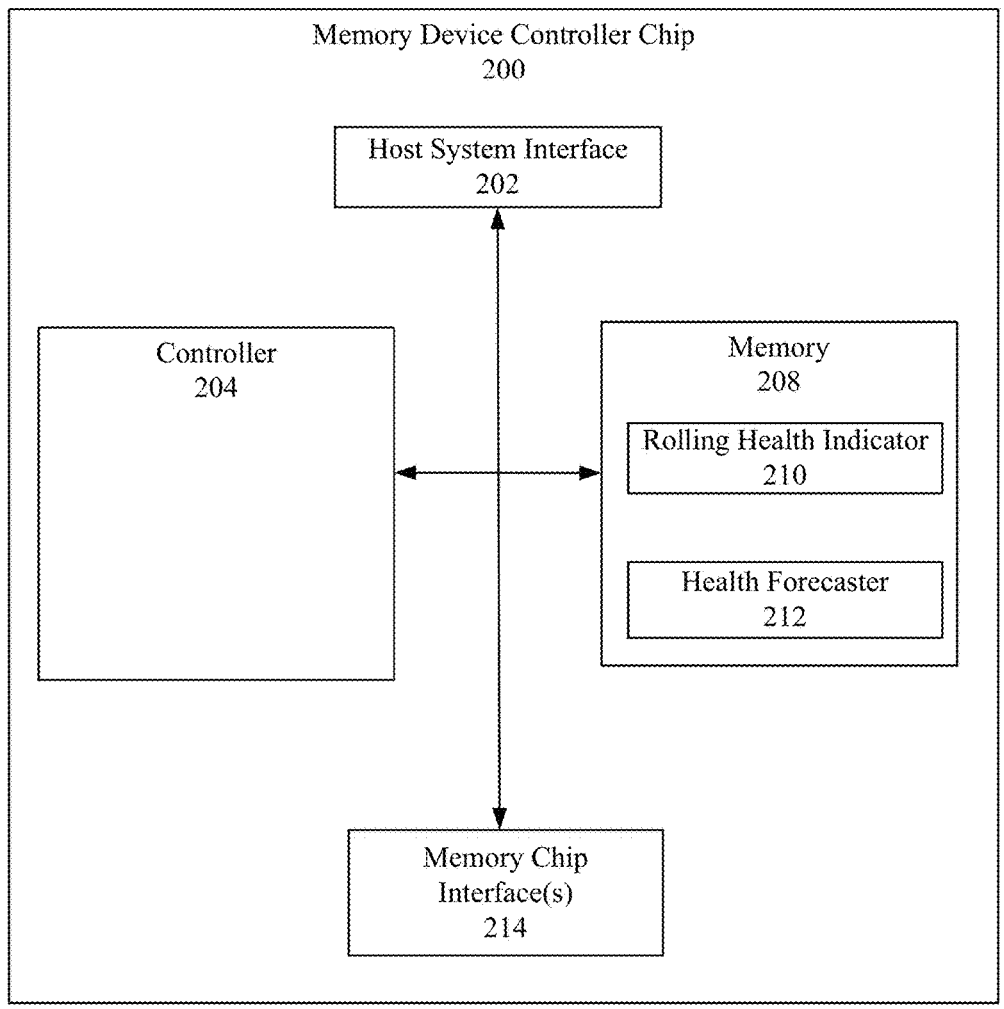
FIG. 2A illustrates memory device controller chip, which is a first example of memory device controller depicted in FIG. 1A.
Figure 2B:
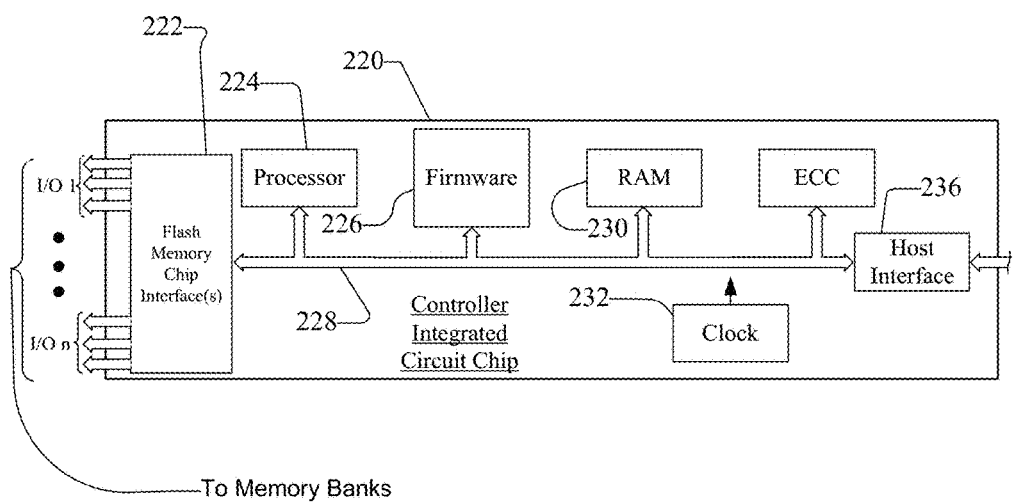
FIG. 2B illustrates memory device controller chip, which is a second example of memory device controller depicted in FIG. 1A.

The system controller 118 may be implemented on a single integrated circuit chip, such as an application specific integrated circuit (ASIC), as shown in FIGS. 2A-B. Further, the various functions performed by the system controller 118 may be performed by a single device, or may be performed by multiple devices, such as shown in FIGS. 2A-B.

FIG. 2A illustrates memory device controller chip 200, which is an example of memory device controller 118 depicted in FIG. 1A. As illustrated in FIG. 2A, memory device controller chip 200 includes host system interface 202, which may comprise circuitry and/or software in order to communicate with the host system 100. Alternatively, host system interface 202 may be external to memory device controller chip 200. Memory device controller chip 200 further includes controller 204, memory 208, and memory chip interface(s) 214. Memory 208 may include rolling health indicator 210 and health forecaster 212. Rolling health indicator 210 may comprise software that is executable by controller 204 to determine the rolling health indicator, such as $y_i$ discussed above. Health forecaster 212 may comprise software that is executable by controller 204 to forecast the health indicator, as discussed above. Memory chip interface 214 may comprise one or more communication lines configured to communicate with one or more memory chips.

FIG. 2B illustrates memory device controller chip 220, which is a second example of memory device controller 118 depicted in FIG. 1A. The memory device controller chip 220 may be implemented on a single integrated circuit chip 220, such as an application specific integrated circuit (ASIC), as shown in FIG. 2B. Further, the various functions performed by the memory device controller chip 220 may be performed by a single device, or may be performed by multiple devices, such as shown in FIG. 2B. More specifically, the memory device controller chip 220 may be segmented into the different devices illustrated in FIG. 2B, such as flash memory interface(s) 222, processor 224, RAM 223, ECC 234, host interface 236, and clock 232. FIG. 2B is merely for illustration purposes.

The processor 224 of the memory device controller chip 220 may be configured as a multi-thread processor capable of communicating separately with a respective memory chip via one or more flash memory interface(s) 222. The flash memory interface(s) 222 may have I/O ports for each of the respective memory chips in the memory 116. The memory device controller chip 220 may include an internal clock 232. The processor 224 may communicate with an error correction code (ECC) module 234 (discussed in more detail below), a RAM buffer 230, a host interface 236, and firmware 226 (which may include boot code ROM) via an internal data bus 228.

Figure 3:
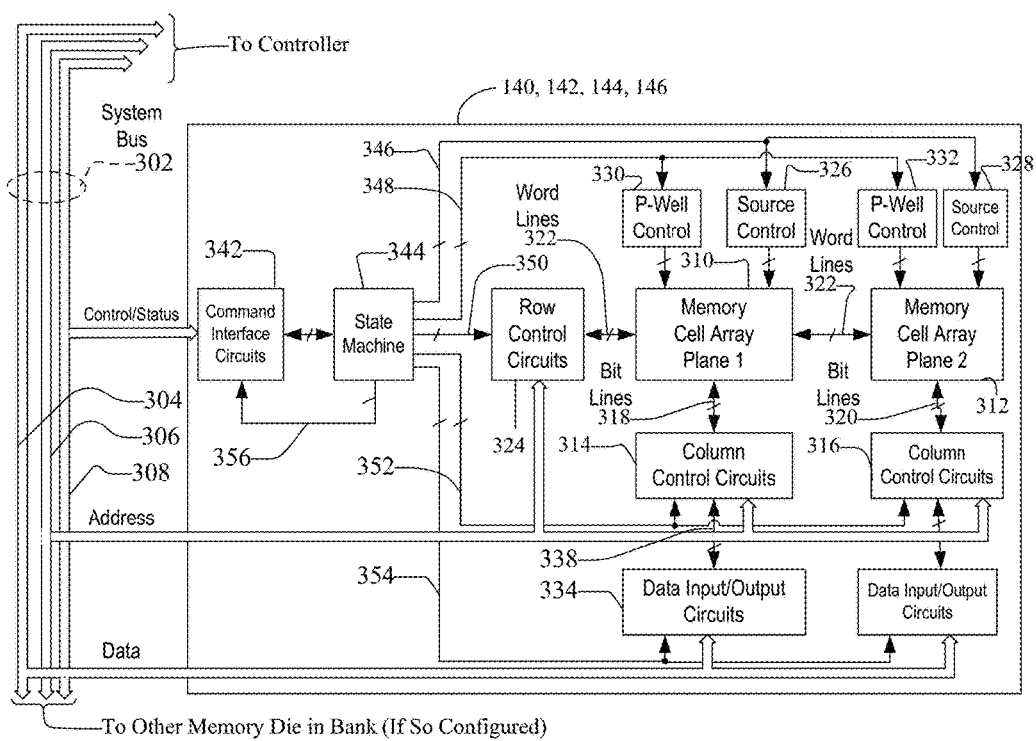
FIG. 3 is an example one flash memory bank suitable as one of the non-volatile memory banks illustrated in FIG. 1A.

Each die 140, 142, 144, 146 in the memory 116 may contain an array of memory cells organized into multiple planes. FIG. 3 shows one of such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 19. Source voltage control circuits 326 and 328 are also connected with the respective planes, as are p-well voltage control circuits 330 and 332. If the bank 300 is in the form of a memory chip with a single array of memory cells, and if two or more such chips exist in the system, data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each bank 120 to program data, read data, erase and attend to various housekeeping matters, each memory chip also contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
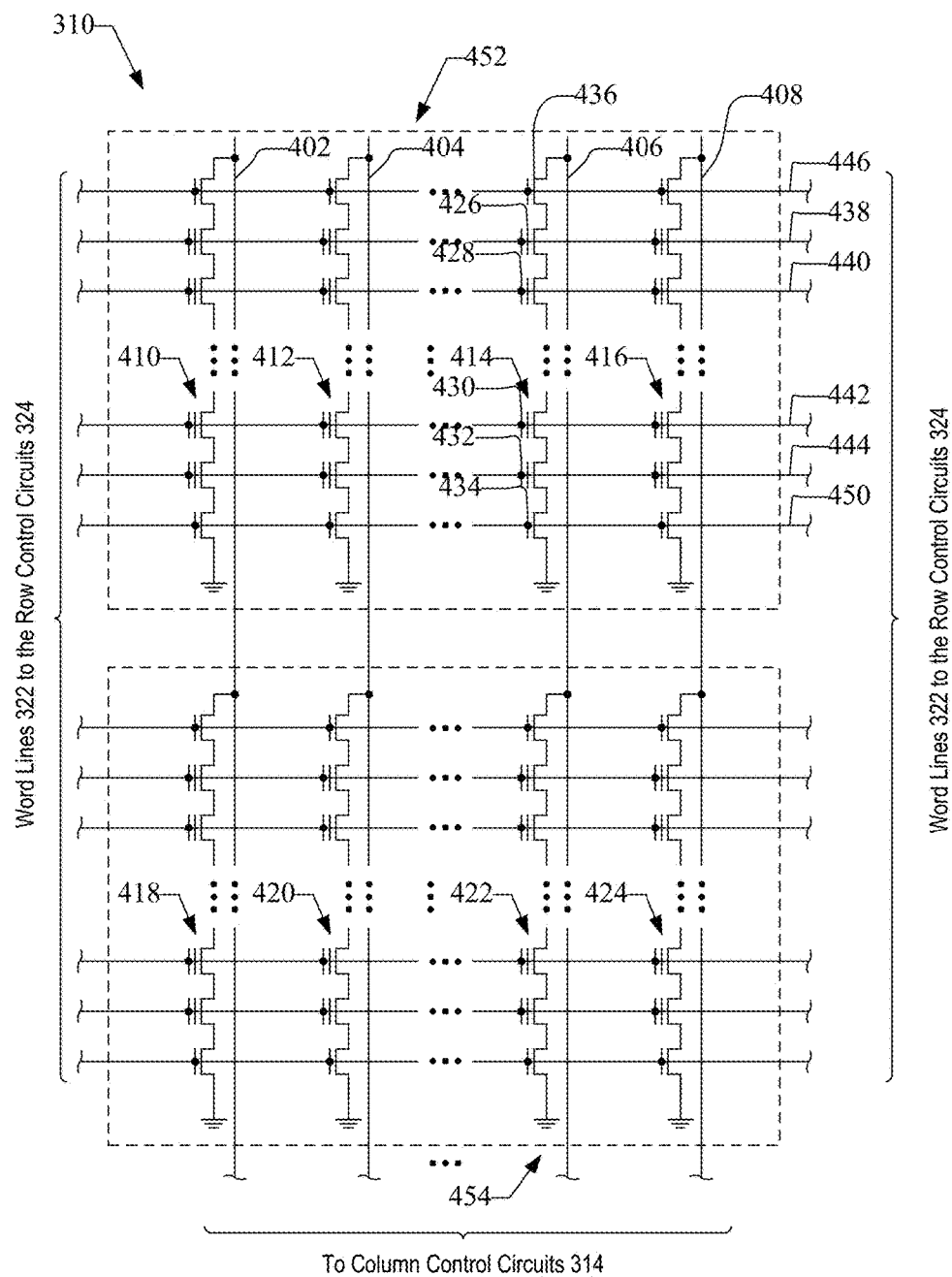
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. The row along the word line 438 is programmed last.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi-level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
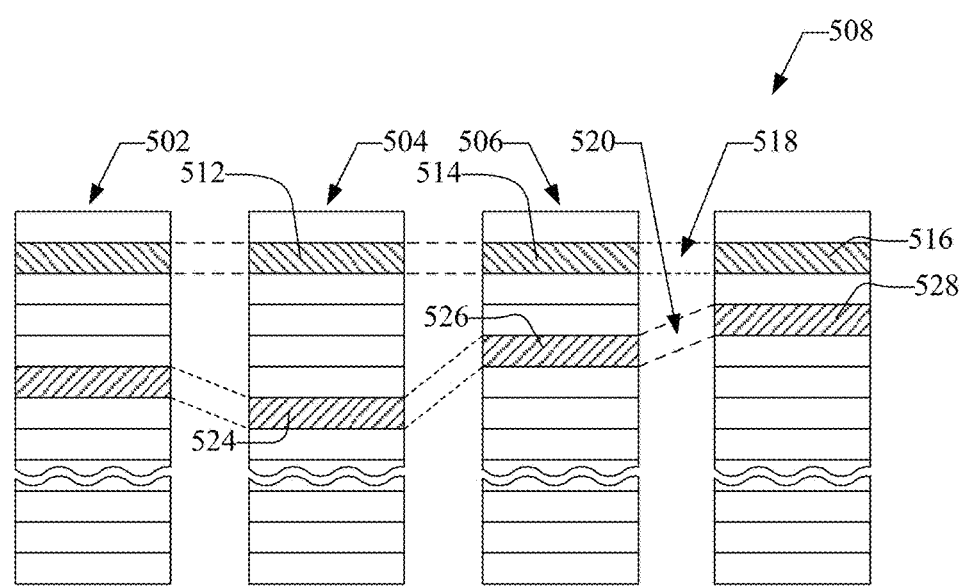
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory device can be operated with the ability to dynamically form metablocks of any or all of one, two or three blocks in different planes. This allows the size of the metablock to be more closely matched with the amount of data available for storage in one programming operation.

Figure 6:
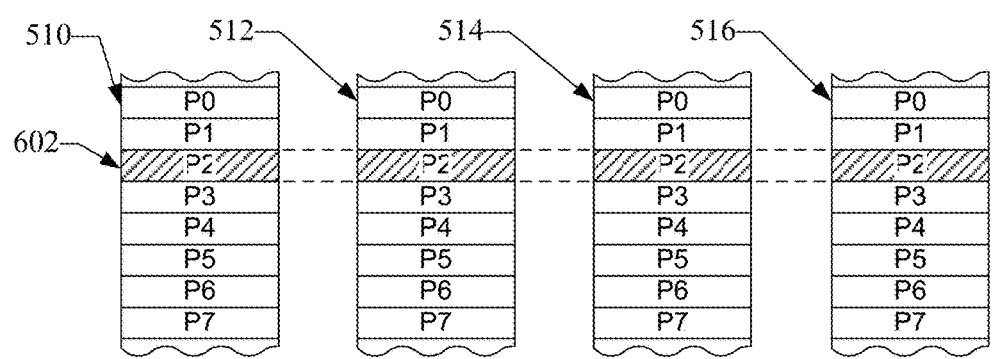
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory device operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks. Within a die, a metapage is the maximum unit of programming.

As discussed above, the health indicator may include a considerable amount of noise, such as illustrated in FIG. 9A. FIG. 9B illustrates a graph of the raw failed bit count and the rolling average, with the rolling average representing the measurement after filtering. As shown, filtering may effectively reduce the measurement noise and produce a smoother health metric. In this regard, the memory device using the smoother health metric may be more robust.

Figure 9C:
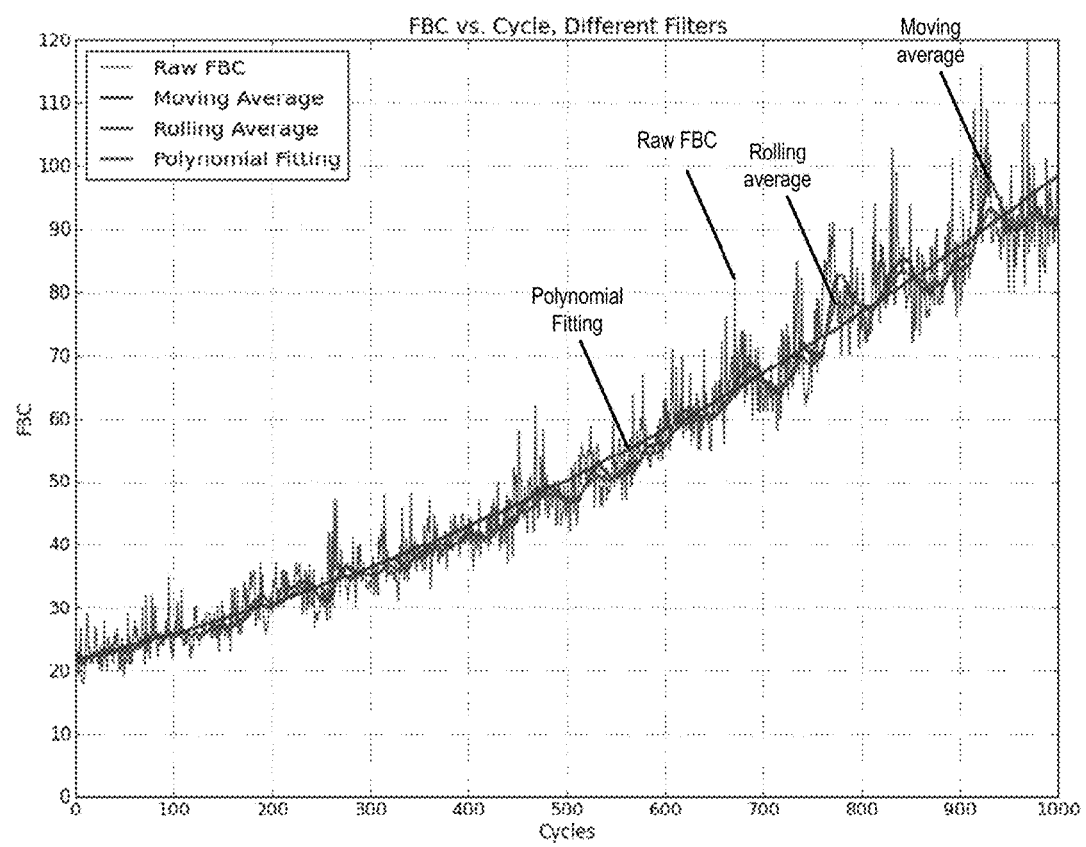
FIG. 9C illustrates a graph of the raw failed bit count, the rolling average, the moving average and the polynomial fitting.

The rolling average may be contrasted with other health metrics, such as the moving average, illustrated in FIG. 9C. Unlike the moving average, the history of the health metric is compressed using the rolling average, resulting in a single value and thus more efficient for a memory constrained system. FIG. 9C further illustrates a polynomial fitting, which may comprise an interpolation with polynomials that could be used for prediction, as discussed in more detail below.

Figure 7:
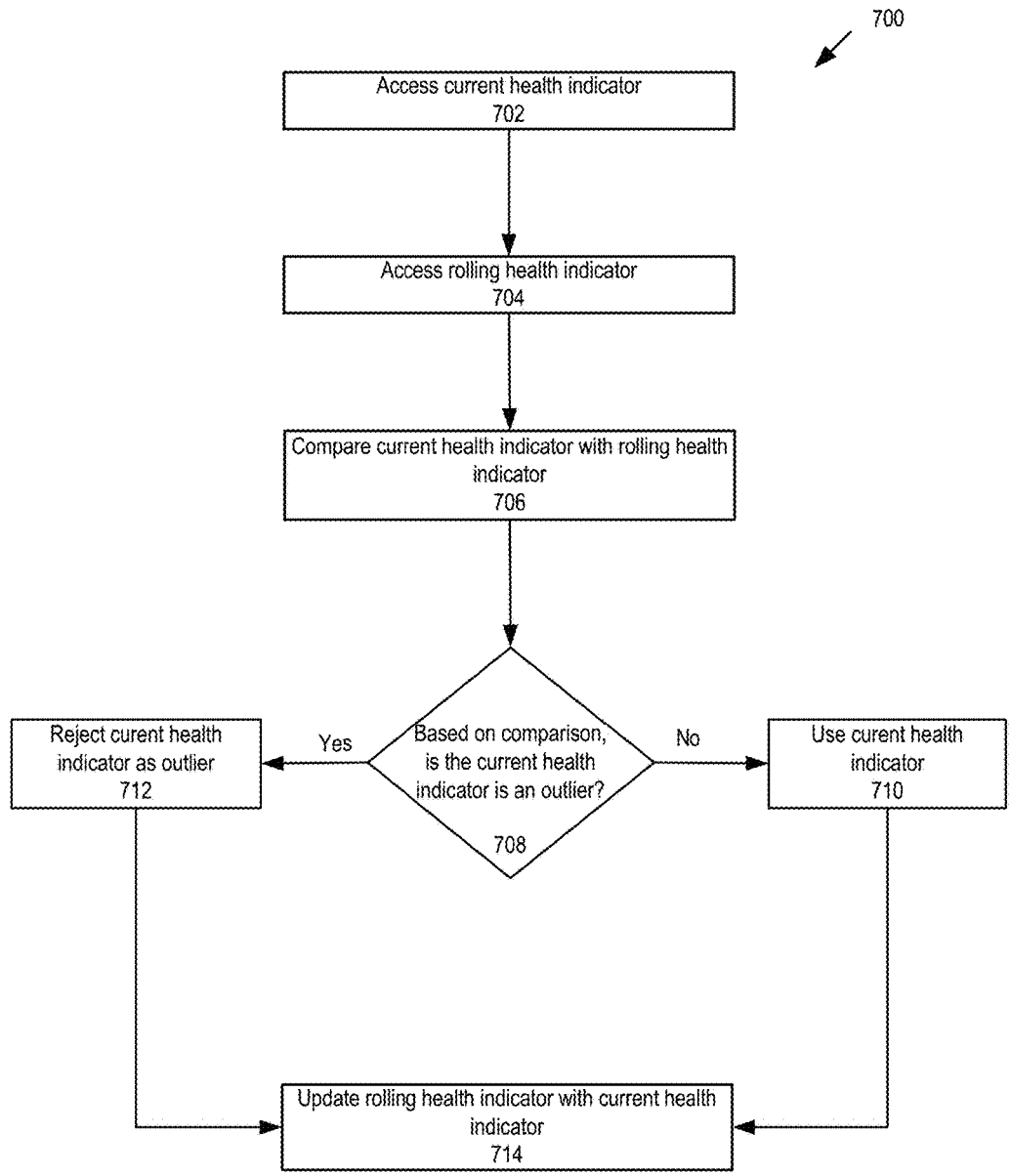
FIG. 7 is a flow diagram for determining whether a current health indicator is an outlier.

FIG. 7 illustrates one example of a flow diagram 700 for determining whether a current health indicator is an outlier. At 702, the current health indicator is accessed. In one embodiment, flow diagram 700 may be triggered in response to receipt of the current health indicator. For example, in response to receipt of the bit error rate from the ECC engine, the flow diagram 700 may be executed. Alternatively, flow diagram may be triggered in response to a predetermined event. For example, the memory device may determine to evaluate the health of a block. In response to the determination, the flow diagram may be triggered, in which a current health indicator (stored previously) may be accessed. At 704, the rolling health indicator is accessed. As discussed above, in one embodiment, the rolling health indicator may comprise a single value. In this regard, the rolling health indicator may only require one storage location (rather than multiple storage locations that may be required for other types of composite health indicators).

At 706, the current health indicator is compared with the rolling health indicator. One or more types of comparisons may be used. For example, the comparison may result in a determination of the difference between the current health indicator and the rolling health indicator. The difference may be manifested in one of several ways. In one way, the difference may comprise a difference in values. For example, in the example of the health indicator being a bit error rate, the difference may be the bit error rate of the current health indicator and the rolling health indicator. More specifically, if the current bit error rate is 80 and the rolling bit error rate is 74, the difference in values may be 6. In another way, the difference may comprise a difference in percentages (e.g., the current health indicator may be represented as a percentage (%) of the rolling health indicator.

At 708, it is determined, based on the comparison, whether the current health indicator is an outlier. The determination may compare the difference between the current health indicator and the rolling health indicator with a predetermined difference. For example, the difference (whether percentage or values) in the current bit error rate and the rolling bit error rate may be determined.

The difference may then be compared to one or more predetermined values. For example, the difference in the current bit error rate and the rolling bit error rate may be compared with a single predetermined value. In response to determining that the difference is greater than the single predetermined value, the current health indicator is rejected. In the example above where the current bit error rate is 80 and the rolling bit error rate is 74 resulting in a difference of 6, the difference may be compared with a single predetermined value (e.g., 5). So that, if the current health indicator is +/−5 of the rolling health indicator, the current health indicator is not rejected. As another example, the difference in the current bit error rate and the rolling bit error rate may be compared with multiple predetermined values. In the example given, it may be assumed that the bit error rate increases over time (or over cycles). Thus, a first predetermined value may be used for positive differences (where the current health indicator has a higher bit error rate than the rolling health indicator) and a second predetermined value may be used for negative differences (where the current health indicator has a lower bit error rate than the rolling health indicator). More specifically, the first predetermined value may be 5 (i.e., the current health indicator will not be rejected if the current bit error rate is 5 greater than the rolling bit error rate), and the second predetermined value may be 2 (i.e., the current health indicator will not be rejected if the current bit error rate is 2 less than the rolling bit error rate). Thus, in response to determining that the difference is greater than the one or more predetermined values, the current health indicator may be determined to be an outlier.

Figure 9D:
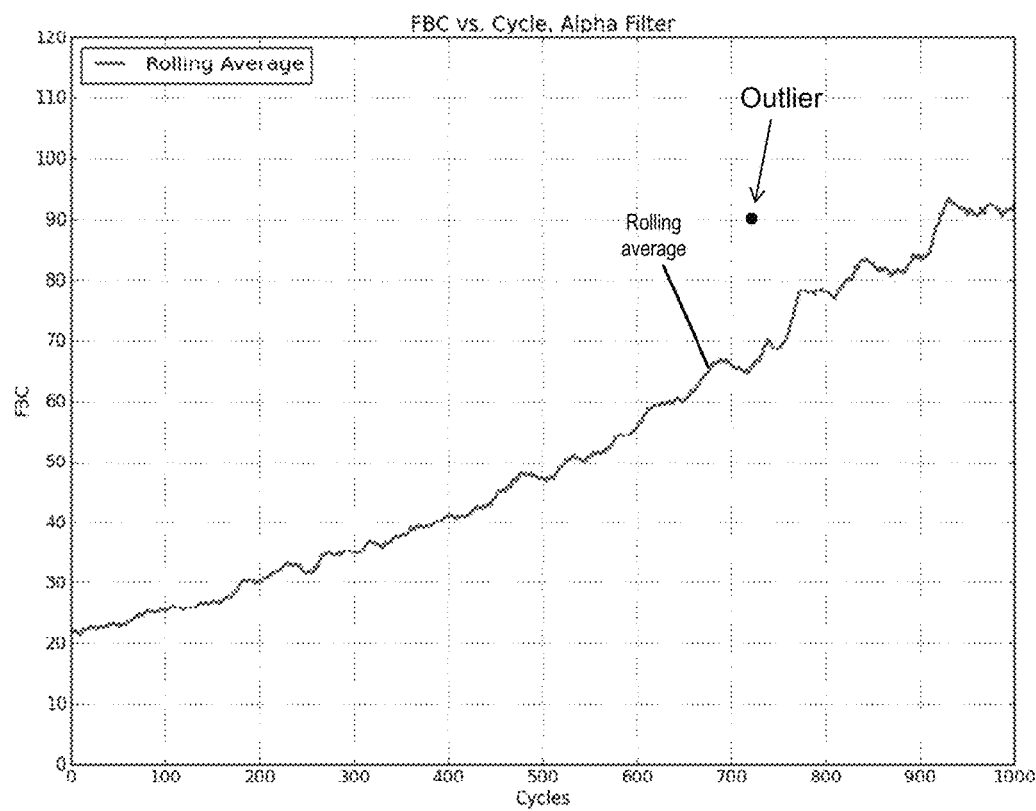
FIG. 9D illustrates a graph of the rolling average (illustrated in FIGS. 9B-C) and an outlier of the failed bit count.

In response to determining that the current health indicator is not an outlier, at 710, the current health indicator is used. In response to determining that the current health indicator is an outlier, at 712, the current health indicator is rejected. An example of an outlier for the failed bit count is illustrated in FIG. 9D. The rejection of the current health indicator may take one or more forms. For example, the rejection of the current health indicator may result in the system controller 118 determining not to use the current health indicator for any purpose. More specifically, based on determining that the current bit error rate associated with a respective block is an outlier, the system controller 118 may determine not to copy the data from the respective block. Further, based on determining that the current bit error rate associated with a respective block is an outlier, the system controller 118 may determine not to use the current bit error rate for the rolling bit error rate. As another example, the rejection of the current health indicator may result in the system controller 118 determining not to use the current health indicator for one purpose, but use the current health indicator for other purpose(s). More specifically, based on determining that the current bit error rate associated with a respective block is an outlier, the system controller 118 may determine not to copy the data from the respective block, but may use the current bit error rate for the rolling bit error rate.

At 714, the rolling health indicator is updated using the current health indicator. In one embodiment, even if the current health indicator is rejected, the current health indicator is used to update the rolling health indicator. In an alternative embodiment, in response to rejecting the current health indicator, the current health indicator is not used to update the rolling health indicator.

Figure 8A:
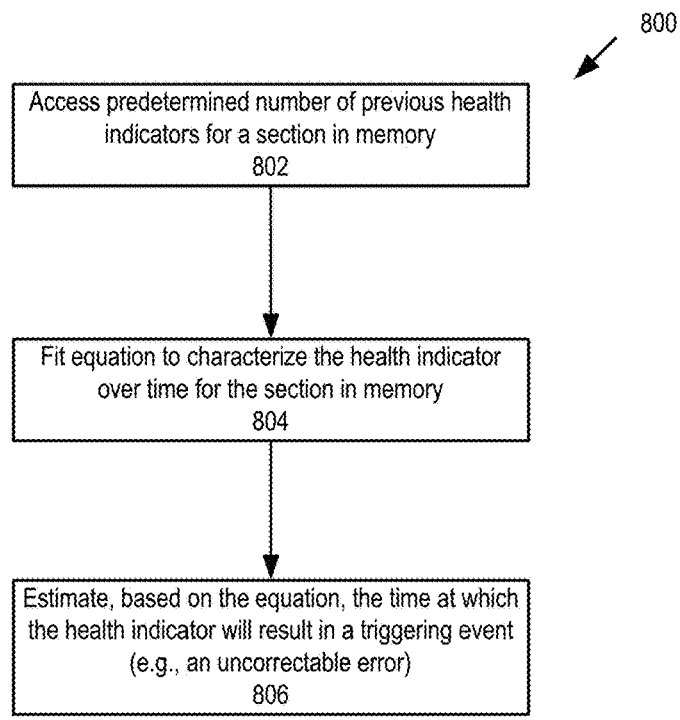
FIG. 8A is a flow diagram for estimating the time at which the health indicator will result in a triggering event.

FIG. 8A illustrates one example of a flow diagram 800 for determining, based on a forecast of the health indicator, when a triggering event will occur. At 802, a predetermined number of previous health indicators associated with a section of memory is accessed. As discussed above, the health indicator may be associated with any section of memory, such as a wordline, a block, or the like. One, some, or all of the previous health indicators associated with the section of memory may be accessed. As one example, all of the previous health indicators associated with the section of memory may be accessed. As another example, a subset of all of the previous health indicators associated with the section of memory (such as the last 40 previous health indicators) may be accessed.

At 804, an equation is fit to the accessed health indicators in order to characterize the health indicators over time. For example, the failed bit count behavior for a block may be forecasted from the previous 600 observed cycles. The forecast may use a quadratic polynomial to extrapolate to a cycle in the future, such as to a predetermined cycle, or a predetermined event, as discussed in more detail below.

Figure 9E:
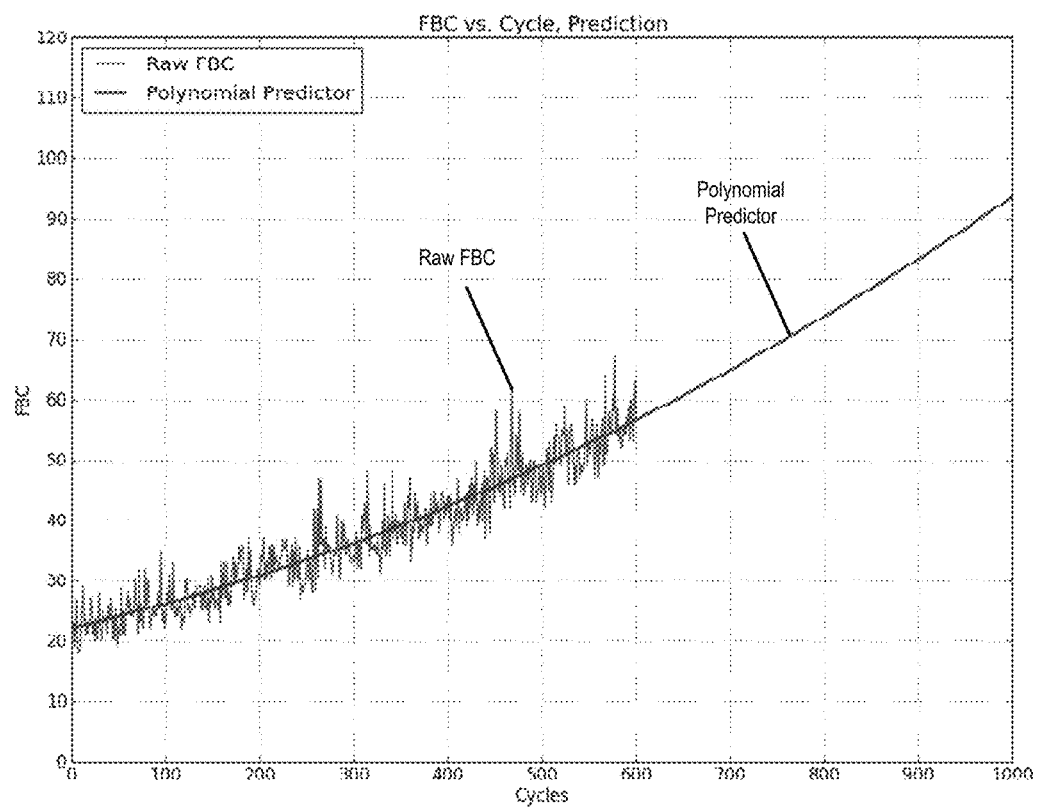
FIG. 9E illustrates a graph of the raw failed bit count and a polynomial predictor of the failed bit count.

In one embodiment, the polynomial equation may be used to estimate for a predetermined event in the future. For example, at 806, the health indicator is estimated, using the polynomial equation, to the time at which a triggering event, such as a bit error rate that results in an uncorrectable error, occurs. In an alternate embodiment, the polynomial equation may be used to estimate for a predetermined time (and/or a predetermined cycle) into the future. For example, the health indicator may be estimated at the $1,000^{th}$ cycle, such as illustrated in FIG. 9E.

In this regard, the polynomial equation may be used to estimate the health indicator into the future. For example, the health indicator may be forecast for different blocks in the memory of the memory device. More specifically, the health indicator may be forecast for a first future point at which the uncorrectable error occurs in a first block and a second future point at which the uncorrectable error occurs in a second block. The use of either or both of the first block or the second block may be modified such that the difference between the first future point and the second future point may be decreased (e.g., the time at which the first block and the second block experience uncorrectable errors are closer in time to one another). In particular, if the first block has a longer time at which an uncorrectable error occurs than the second block, the controller of the memory device may determine to use the first block more than the second block. Thus, the time at which the first block fails is sooner and the time at which the second block fails is later, thereby decreasing in the difference in the failure times of the first and second blocks.

Alternatively, the forecast for the different blocks may be for a predetermined time in the future (such as 1000 cycles in the future). The health indicator for the first block and the health indicator for the second block may be determined at the predetermined time in the future. In the event that the health indicator for the first block and the health indicator for the second block are different from one another (e.g., different by more than a predetermined amount), the use of either or both of the first block or the second block may be modified such that the difference in health indicators may be decreased (e.g., the health indicators for the first and second blocks may be more similar in terms of health). In particular, if the first block at the 1000 cycle in the future is healthier than the second block at the 1000 cycle in the future, the controller of the memory device may determine to use the first block more than the second block. Thus, the health of the first block may be more similar to the health of the second block.

Figure 8B:
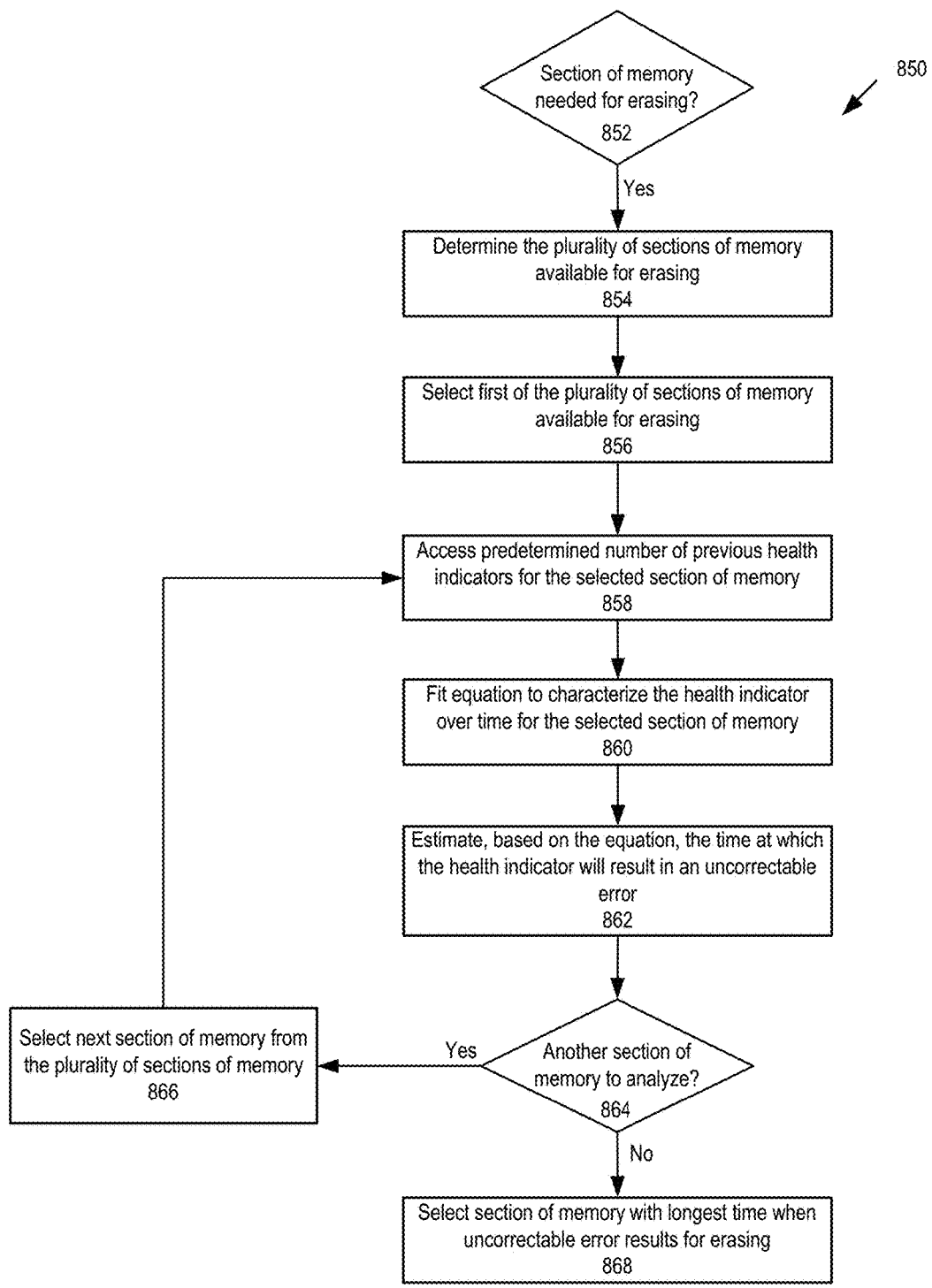
FIG. 8B is a flow diagram for determining which section of memory to program based on estimating when the health indicator will result in an uncorrectable error.

FIG. 8B illustrates another example of a flow diagram 850 for forecasting the health indicator of different sections of memory in order to determine which section of memory to select for erasing. At 852, it is determined whether a section of memory (such as a block of memory) is needed for erasing. If so, at 854, the plurality of sections available for erasing is determined. At 856, the first of the plurality of sections available for erasing is selected. At 858, a predetermined number of previous health indicators for the selected section of memory are accessed. As discussed above, various numbers of previous health indicators may be accessed in order to fit a curve to the data points.

At 860, an equation is fit to the previous health indicators in order to characterize the health of the selected section of memory over time. An example of this is illustrated in FIG. 9E. At 862, using the equation determined at 860, the time is estimated at which the health indicator for the selected section of memory will result in an uncorrectable error. For example, using the equation, it may be determined when the section of memory will become unusable.

At 864, it is determined whether there is another section of memory (such as another block) to analyze. If so, at 866, the next section of memory is selected and the flow diagram 850 loops back to 858. If not, at 868, the section of memory that is determined to be the healthiest (e.g., with the longest time when the uncorrectable error results) is selected.

In this regard, the history information enables predicting future behavior of the section of memory, thereby allowing the memory device to forecast the life of the section of memory (e.g., forecast the life of the respective block). In particular, the memory device knowing what will happen to the section of memory (e.g., a block, die, or the entire memory) enables greater control of the memory and tuning opportunities, as discussed in more detail below.

Accordingly, the method and system may be realized in hardware, software, or a combination of hardware and software. The method and system may be realized in a centralized fashion in at least one electronic device (such as illustrated in memory device 102 in FIG. 1A) or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be implemented using a computer-readable media. For example, management firmware 124 may be implemented using computer-readable media to implement the functionality described herein, such as discussed in FIGS. 7-8B. A "computer-readable medium," "computer-readable storage medium," "machine readable medium," "propagated-signal medium," or "signal-bearing medium" may include any tangible device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. The computer-readable medium can be a single medium or multiple media. Accordingly, the disclosure may be considered to include any one or more of a computer-readable medium or a distribution medium and other equivalents and successor media, in which data or instructions can be stored. For example, the processor 224 may access instructions stored in memory, such as RAM 230, in order to provide the functionality herein. As another example, the flash memory interface(s) may be configured to implement the functionality described herein. In either example, the system controller 118 may include a device that is configured to perform the functionality described herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A method comprising:
   performing in a memory device:
   accessing a plurality of health indicators for a first section of memory in the memory device, the health indicators indicative of usability of the first section of memory;
   accessing a plurality of health indicators for a second section of memory in the memory device, the health indicators indicative of usability of the second section of memory;
   accessing a predetermined number of future cycles of operation;
   determining a predetermined future cycle of operation of the memory device, the predetermined future cycle of operation of the memory device comprising adding the predetermined number of future cycles of operation to a current cycle of operation of the memory device;
   determining, based n the plurality of health indicators for the first section of memory, a forecast for the health indicator for the first section of memory at the predetermined future cycle of operation of the memory device;
   determining, based on the plurality of health indicators for the second section of memory, a forecast for the health indicator for the second section of memory at the predetermined future cycle of operation of the memory device;
   determining, based on the forecast for the health indicator for the first section and the forecast for the health indicator for the second section, whether to perform a write operation on the first section of memory or on the second section of memory;
   responsive to determining to perform the write operation on the first section of memory, performing the write operation on the first section of memory in order for the first section of memory to be usable at least until the predetermined future cycle of operation; and
   responsive to determining to perform the write operation on the second section of memory, performing the write operation on the second section of memory in order for the second section of memory to be usable at least until the predetermined future cycle of operation.

2. The method of claim 1, wherein the first section of memory comprises a first block of memory; and
   wherein the second section of memory comprises a second block of memory.

3. The method of claim 2, wherein determining the forecast for the health indicator for the first section of memory at the future cycle of operation of the memory device comprises:
   fitting a polynomial to the plurality of health indicators for the first section of memory; and
   examining the polynomial to determine the forecast for the health indicator for the first section of memory at the predetermined future cycle of operation of the memory device.

4. The method of claim 1, wherein the first section of memory comprises a first block;
   wherein the second section of memory comprises a second block;
   wherein determining whether to perform the operation on the first section of memory or the second section of memory comprises:
   comparing the forecast for the health indicator of the first block with the forecast for the health indicator of the second block; and
   determining, based on the comparison, whether to perform the operation on the first block or the second block.

5. A memory device comprising:
   health indicator forecasting circuitry configured to:
   access a predetermined number of future cycles of operation;
   determine a predetermined future cycle of operation of the memory device, the predetermined future cycle of operation of the memory device comprising adding the predetermined number of future cycles of operation to a current cycle of operation of the memory device;
   forecast a health indicator at the predetermined future cycle of operation of the memory device for respective sections of memory of the memory device, the health indicator indicative of usability of the respective section of memory;
   a comparison circuitry configured to compare the forecasted health indicators for the respective sections;
   a write determination circuitry configured to determine one or more of the respective sections of the memory to write to based on the comparison of the forecasted health indicators for the respective sections in order for the one or more sections of memory to be usable at least until the predetermined future cycle of operation; and
   write circuitry configured to write to the one or more of the respective sections of memory based on the write determination circuitry.

6. The memory device of claim 5, wherein the respective sections of memory comprises respective blocks of memory.

7. The memory device of claim 5, wherein the health indicator forecasting circuitry is configured to fit a polynomial to a plurality of health indicators for each of the respective blocks of memory.

8. The memory device of claim 5, wherein the health indicator forecasting circuitry is configured to forecast the health indicator for a first block and to forecast the health indicator for a second block; and wherein the write determination circuitry is configured to modify use of one or both of the first block or the second block such that a difference between the health indicator for the first block and the health indicator for the second block is decreased.

* * * * *